United States Patent [19]

O'Connor et al.

[11] Patent Number: 4,779,265
[45] Date of Patent: Oct. 18, 1988

[54] MULTIPLE ACCESS COMMUNICATION SYSTEM

[75] Inventors: Mary G. O'Connor, Morristown; Jawad A. Salehi, Bedminster; Martin Kerner, Maplewood, all of N.J.

[73] Assignee: Bell Communications Research, Inc., Livingston, N.J.

[21] Appl. No.: 923,328

[22] Filed: Oct. 27, 1986

[51] Int. Cl.$^4$ .................. H04J 3/24; G08C 19/00; H04B 9/00
[52] U.S. Cl. ........................ 370/93; 370/18; 370/19; 340/825.64; 340/825.76; 455/608
[58] Field of Search .............. 340/825.62, 825.64, 340/825.76, 825.73, 825.57; 370/19, 21, 18, 92, 93; 375/25, 68; 455/608, 603, 38

[56] References Cited

U.S. PATENT DOCUMENTS

| | | | |
|---|---|---|---|
| 3,496,546 | 2/1970 | Villafana | 340/825.64 |
| 3,715,508 | 2/1973 | Blasbalg | 370/18 |
| 3,906,348 | 9/1975 | Willmott | 340/825.62 |
| 4,281,409 | 7/1981 | Schneider | 370/18 |
| 4,426,662 | 1/1984 | Skerlos et al. | 455/603 |
| 4,442,550 | 4/1984 | Killat | 455/608 |
| 4,563,774 | 1/1986 | Gloge | 455/607 |

OTHER PUBLICATIONS

"Coding and Decoding for Code Division Multiple User Communication Systems", *IEEE Transactions on Communications*, vol. COM-33, No. 4, Apr. 1985, pp. 310-316, T. J. Healy.

*Primary Examiner*—Robert L. Griffin
*Assistant Examiner*—Andrew J. Telesz, Jr.
*Attorney, Agent, or Firm*—James W. Falk; John T. Peoples

[57] ABSTRACT

Methodology, and associated circuitry, for encoding and decoding signals utilize bistate orthogonal code techniques that effect autonomy of communications and simplified signal processing, thereby improving reliability.

Encoder (121) processes an incoming data stream by associating a bistate orthogonal code with each binary one in the input stream and then by transmitting a series of rate-increased pulses over a path during intervals determined by the code for each of the binary ones.

Decoder (131), in synchronism with encoder (121), is generally arranged as a correlation detector in that the decoder only responds to the particular bistate orthogonal code for which it is configured. Sensors in energy transfer relation to the path are positioned at detection points on the path in correspondence to an assigned code. The outputs of the sensors are processed to produce a rate-decreased detected signal at the rate of the input stream whenever a rate-increased stream corresponding to the decoder configuration is propagating along the path.

14 Claims, 6 Drawing Sheets

MULTIPLE ACCESS COMMUNICATION SYSTEM

CROSS-REFERENCE TO A RELATED APPLICATION

The following U.S. application, which is assigned to the same assignee as the instant application and which is filed concurrently therewith, contains related subject matter:

"Encoding and Decoding for Code Division Multiple Access Communication Systems", U.S. Ser. No. 423,332 of F. R. K. Chung—M. Kerner—M. G. O'Connor J. A. Salehi—V. K. Wei.

FIELD OF THE INVENTION

This invention relates generally to digital communication systems and, more particularly, to a methodology and associated circuitry for encoding and decoding signals to effect information interchange among a plurality of stations interconnected via a common wideband channel.

BACKGROUND OF THE INVENTION

Present day communication networks must generally serve end-users requiring a broad range of integrated (data/voice/video) services. For example, a large business with hundreds of employees and numerous host machines and communication needs for facsimile, high resolution graphics and video may require up to 1 gigabit/sec. transmission capability. Other networks might operate at transmission rates in excess of 10 megabit/sec to interconnect terminals, intelligent workstations and personal computers to a large host or to interconnect small numbers of large hosts.

To achieve this capability, network operations previously performed electronically can now be implemented with optical processing, and the networks are configured with optical devices such as laser transmitters, photodiode receivers and fiber optic cables.

In many conventional electronic systems, the signals propagating over the channel facility may be expressed in terms of voltage and current waveforms. In the voltage-current domain, it is possible to generate and detect both positive and negative voltages and currents. For instance, channel signals could include, on a normalized basis, the ±1 signals as well as the 0 state, and detection of these signals takes advantage of the ability to sum voltages or currents to zero. With one technique, a so-called orthogonal code is utilized for encoding incoming signals and a receiver is configured as a so-called correlation detector. Because of the availability of two polarities, the overlap or projection of one pattern from the orthogonal code onto a different pattern from the code over a given time interval (basically a correlation operation) may be reduced essentially to zero. This allows for an effective detection process by the receiver since a high correlation implies that signal on the channel matches the receiver configuration whereas a low correlation indicates the signal is not destined for the particular receiver.

In an optical system, signals on a channel are propagated by the presence or absence of light energy or photons, that is, information interchange is conveyed by the ON/OFF signal states; this is in contrast to the plus, minus and zero states of electronic systems. In optics, there is no equivalent to negative values. Optical detection is equivalent to power measurement and, since power is inherently non-negative, detected signals cannot be optically manipulated to add to zero with other incident power. Thus, conventional electronic processing techniques cannot be exploited in the optical domain (or, for that matter, in any domain having a zero state and only one non-zero state), so two-state systems have required the consideration of new signal coding schemes satisfying new sets of constraints.

In a multiple user environment having only two propagation states, the considerations become even more complex. Signal separation and, ultimately, signal detection are generally achieved by time or frequency division, that is, a time or frequency slot is dedicated to each user. This is oftentimes inefficient. An alternative approach for a multiple user environment is code division. This method of transmission exploits codes in such a way that a user is able to extract the message intended for the user from the superposition of many messages on the transmission facility. Two exemplary versions of this technique are discussed in the article entitled "Coding and Decoding for Code Division Multiple User Communication Systems", published in the *IEEE Transactions on Communications*, Vol. COM-33, No. 4, April, 1985. Decoding in conventional code division systems is generally quite complex and a substantial portion of processing time is dedicated to decoding time, thereby reducing throughput.

SUMMARY OF THE INVENTION

The limitations and shortcomings of conventional techniques for encoding, transmitting and decoding information in a system supporting only two signal propagation states are obviated, in accordance with the present invention, by methodology and corresponding circuitry for encoding and decoding the information with code patterns that engender the two-state equivalent of electronic orthogonal coding in a code division multiple access environment. These special code patterns are referred to as bistate orthogonal codes.

Broadly, in contrast to offsetting positive states of a coded signal over a given time interval to mitigate correlation of different patterns from the code, bistate orthogonal coding utilizes delay to minimize the projection of one code pattern onto another code pattern from the code. To introduce the delay dimension into the overall processing, each non-zero state emanating from a source controls a rate-increased stream of two-state signals called a signature pattern or signature template. Each source is assigned a particular signature. The channel signal comprises a composite of the signatures from the various active sources propagating over the channel. The sources are synchronized to the rate of the rate-increased stream.

Each receiver is also assigned a preselected signature and is configured accordingly. In one illustrative embodiment, signal taps are positioned along the channel in correspondence to the preselected signature. Whenever the sources and receivers are synchronized, and the preselected signature embedded in the composite channel signal is aligned with the taps, a threshold level in the receiver is exceeded, thereby indicating detection of the associated signature. The receiver also effects a rate-decreasing operation to restore the original information rate.

The code patterns selected are based on the manner in which the receivers are configured. If each receiver is enabled once at the rate corresponding to the original signal rate for a time period related to the rate of the rate-increased stream, one class of bistate orthogonal codes is admissible. If each receiver is enabled each time period, a second class of bistate orthogonal codes is admissible.

The organization and operation of this invention will be better understood from a consideration of the detailed description of the illustrative embodiments thereof, which follow, when taken in conjunction with the accompanying drawing.

DETAILED DESCRIPTION

Overview

Figure 1:
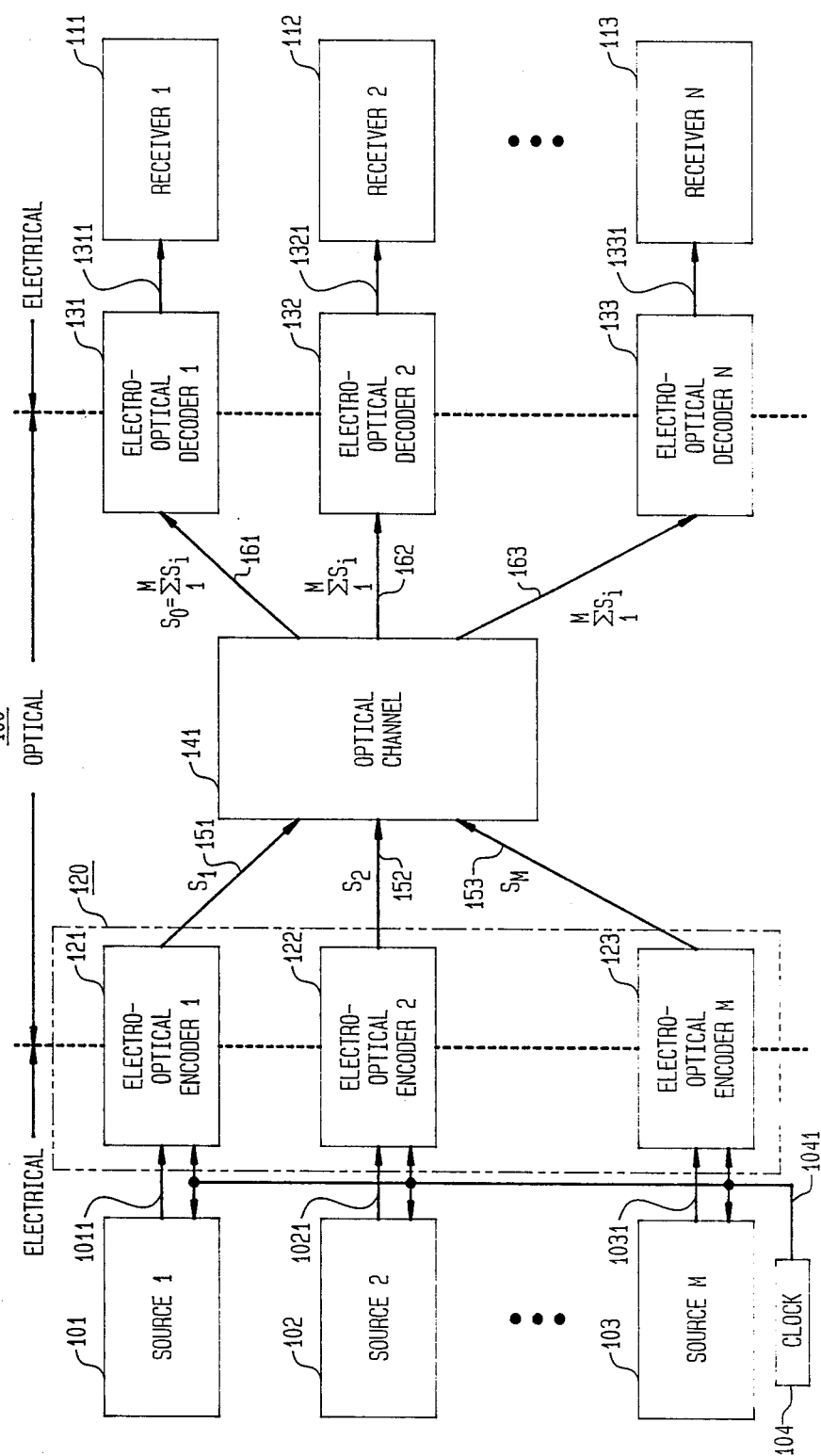
FIG. 1 depicts, in block diagram form, the electro-optical communication system under consideration in accordance with the present invention.

The general communication system 100 under consideration is depicted in block diagram form in FIG. 1. In system 100, M sources 101, 102, ..., 103 are arranged to communicate with N receivers 111, 112, ..., 113 over interposed optical channel 141. Sources 101-103 are coupled to channel 141 via electro-optical encoders 121-123, respectively, which comprise transmitter 120. In addition, electro-optical decoders 131-133 serve to couple the channel signals to receivers 111-113, respectively. Each encoder 121, 122 or 123, besides performing an encoding function, also converts electrical input signals to optical output signals. Similarly, each decoder 131, 132 or 133, besides effecting a decoding function, is also arranged to convert optical input signals to electrical output signals. The optical portion of system 100 is shown generally as between the dashed lines that intersect, respectively, the encoder blocks and the decoder blocks.

Although FIG. 1 shows M sources and N receivers, the encoding and decoding techniques in accordance with the present invention are applicable as well to the special cases where M or N equals 1, i.e., the cases where a single transmitter transmits to multiple receivers, or multiple transmitters transmit to a single receiver.

The channel under consideration, as exemplified by optical channel 141, is of the type that propagates only two-level or two-state digital signals, such as a logic zero (a "space") and a logic one (a "mark"). To match this channel characteristic, signals emanating from encoders 121, ..., 123 on leads 151, ..., 153, designated by signature signals $S_i, i=1, \ldots, M$, respectively, provide a stream of two-level or mark and space signals. Each $S_i$ stream corresponds to a similar stream produced by each source 101, ..., 103, respectively, as discussed shortly. Since channel 141 only supports two-level signals, if one or more encoders 121-123 propagate logic one signals over channel 141 during the same time duration, the channel level remains a logic one. The channel level is logic zero if all the $S_i$ outputs, $i=1, \ldots, M$, are zero during the same time duration. In a logical sense, channel 141 behaves as an "inclusive OR" channel.

The composite signal on channel 141 due to all $S_i$'s is the superposition of all $S_i$'s and is represented by $$S_o = \sum_{1}^{M} S_i,$$

where the summation is treated in the inclusive OR sense. Each lead 161, ..., 163 emanating from channel 141 in FIG. 1 serves as an input to and provides composite signal $S_o$ to decoders 131, ..., 133, respectively. It follows from this description that all signatures $S_i, i=1, \ldots, M$ share substantially the same frequency band on channel 141.

Each signature signal $S_i, i=1, \ldots, M$ is constrained in time such that sources 101, ..., 103 must initiate a transmission or information interchange in synchronism. One approach to achieving this synchronism is shown in FIG. 1. Clock 104 generates the timing signal, via lead 1041, which controls framing and synchronization among sources 101-103 and encoders 121-123. The encoding and decoding techniques in accordance with the present invention also allow the use of a special synchronization code, satisfying the same constraints as other assigned codes, which, when continually transmitted, would provide for network synchronization.

Decoders 131, ..., 133 are in synchronism with encoders 121-123. Encoders "train" the decoders using any of the well-known training techniques to provide the requisite synchronization. In addition, receivers 111-113 are arranged to be in synchronism with decoders 131-133.

Figure 2:
FIG. 2 depicts the relationship between the incoming electrical signal and the rate-increased optical signal propagated by any of the encoders of FIG. 1.

The primary function of each encoder 121, ..., 123 is that of converting each logic one received from each corresponding source 101, ..., 103 to a predetermined rate-increased stream of logic ones and logic zeros, as depicted generically in FIG. 2. Line (i) in FIG. 2 depicts three contiguous data bits, namely, a "mark-space-mark" sequence appearing in the output stream of, say, source 101 or the input stream to encoder 121. The time interval of either a mark or space is designated as a bit duration.

Line (ii) in FIG. 2 represents an output pulse stream, say $S_1$ from encoder 121, corresponding to the line (i) input stream. As shown, a rate-increased stream of logic one and logic zero pulses, which is replicated for all other marks produced by source 101, is generated by encoder 121. Since channel 141 is, illustratively, an optical medium, the logic one levels in output stream $S_1$ correspond physically to light or photon pulses.

In the rate-increased or optical portion of system 100, a frame corresponds to a bit duration, and the time interval of a logic one light pulse or a logic zero (no light pulse) is designated the chip duration. Thus, each frame is composed of a fixed number of so-called "chips"; three logic one chips occur during each mark frame in FIG. 2. The envelope of the mark frames is shown by the dashed rectangles on line (ii) of FIG. 2.

In order to communicate effectively within system 100, each signature $S_i, i=1, \ldots, M$, as produced by its assigned encoder in response to an input mark, may not be selected arbitrarily, but must be carefully chosen to achieve efficient, error-free communication. This means basically that each $S_i$ must be selected in view of all the other $S_i$'s based on such considerations as number of sources M and the bandwidth of channel 141. These considerations, in turn, depend on the communication or system requirements or transmission characteristics. Sets of signatures $S_i, i=1, \ldots, M$ which effect efficient information interchange for a given number of chips and sources are discussed below.

The essential function of each decoder 131, ..., 133 is that of discriminating within the composite signal $S_o$ the preassigned signature associated with each decoder 131, ..., 133. In one illustrative embodiment, each decoder 131, ..., 133 is implemented by optical tapped delay lines arranged along channel 141. The optical separation among taps for each decoder corresponds to the distribution of logic one chips in the signature preassigned to the decoder. Thus, whenever a mark is transmitted, each tap in a given decoder extracts a high-peak signal whenever the logic one chips in the preassigned signature propagating as part of $S_o$ are aligned with the taps. In this way, a so-called peak correlation manifests the arrival of the preassigned signature and, in turn, the propagation of a mark by the source having the same preassigned signature. A decoder illustrative of these principles is presented shortly.

The above overview description with reference to FIGS. 1 and 2 provides a basic framework for the principles of the present invention. The following sections elaborate on the details of illustrative embodiments, particularly those representative of encoders 121-123 and decoders 131-133.

Bistate Orthogonal Codes

For clarity of exposition, it is helpful first to consider particular examples of bistate orthogonal code sets in accordance with the present invention. The reason is three-fold, namely: it affords the opportunity to introduce terminology and notation; it provides a heuristic basis for the general encoding-decoding principles to be elucidated; and it highlights the differences in processing corresponding to different system assumptions.

1. Heuristic Basis

In the examples discussed in this section, two cases of synchronous transmission systems referred to earlier are distinguished. The first, Case I, is one in which processing is carried out frame-by-frame. The second, Case II, is one in which processing is carried out continuously. As shall be discussed below, these two cases generate different constraints on acceptable codes and require different algorithms.

Given a pulse pattern in K chips, $c_1, c_2, \ldots, c_K$, then the delay between chips $c_i$ and $c_j$ is defined as $|(i-j)|$. The vector representation of a code of K chips in which M are marked to indicate pulses is as follows: The vector has form $<d_1, d_2, d_3, \ldots, d_M>$, where $d_i$, for $1 \leq i \leq M-1$, equals the delay between the $i_{th}$ and $(i+1)^{st}$ marked chip, and $d_M$ equals $$K - \sum_{i=1}^{M-1} d_i.$$

Figure 3:
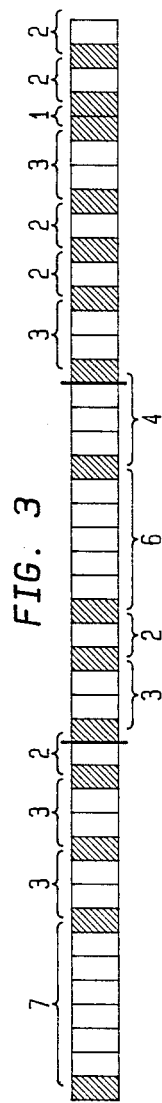
FIG. 3 illustrates the operation of transmitting superimposed code patterns.

With reference to FIG. 3, a code is shown comprising tour pulses in the 1st, 8th, 11th and 14th slots of a 15-chip frame. The notation for this code is $<7,3,3,2>$. In the next frame are the pulses for a $<3,2,6,4>$ code, with pulses in the 1st, 4th, 6th and 12th chips. In the next frame, both codes are superimposed, so that pulses appear in the 1st, 4th, 6th, 8th, 11th, 12th and 14th chips. The notation for the pulses in this frame is $<3,2,2,3,1,2,2>$.

It is now envisioned that a template representation of a $<7,3,3,2>$ code is being compared with the transmitted signal, frame-by-frame. In the first frame, all four transmitted pulses overlap. In the second frame only one pulse overlaps. In the third frame, all four pulses again overlap. The detector will recognize that a "1" as transmitted in the first frame, a "0" was transmitted in the second frame, and another "1" was transmitted in the third frame.

It is important to notice that when codes are superimposed on a frame, gaps between pulses may be generated which do not appear in the individual codes. For example, when the two codes were superimposed in the previous example, a gap of "1" appeared, representing the gap between the 3rd pulse of the 1st code and the 4th pulse of the 2nd code. No gap of "1" appears in the individual codes. Since the simultaneous transmission of codes within a single frame may generate new gaps, care must be taken in the generation of codes to guarantee that when a receiver's code aligns with M pulses in a frame, it is the result of the receiver's code intentionally being transmitted, and not the result of gaps being detected that are the result of simultaneous transmission of signals. It is also important to note that the synchronous nature of the transmission is important to the ability to identify the gaps that can possibly appear when all codes are transmitted.

Case I CDMA codes are defined to be codes with the property that when arbitrary combinations of the codes are superimposed on a single frame and the frames are processed discreetly, any detector will match with precisely 0, 1, or M pulses, and M pulses will be matched only when the receiver's assigned code has been transmitted. An algorithm for generation of these codes is described in Section 3.

Case II is now considered, where comparisons between a receiver's code with the transmitted signals is not made frame-by-frame, as described above, but continuously.

Figure 4:
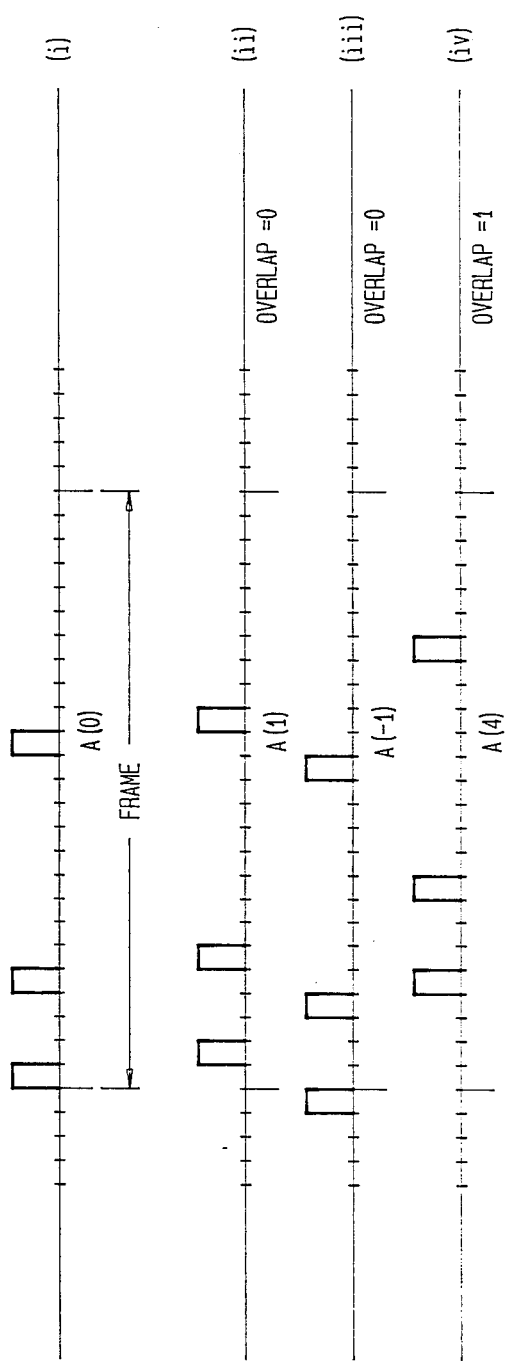
FIG. 4 illustrates the operation of shifting one code pattern relative to a second, fixed code pattern.

With reference to FIG. 4, a code pattern depicted on line (i) has representation $<4,10,11>$ in a 25-chip frame.

Line (ii) of FIG. 4 depicts the same code pattern shifted one unit to the right and, therefore, is designated as pattern $A(1)$. Lines (iii) and (iv) depict, respectively, a left-shift of one unit $(A(-1))$, and a right-shift of four units $(A(4))$.

Comparison of line (i) with line (iv) of FIG. 4 indicates that the code patterns "overlap", that is, have a common chip. Thus, $A(4)$ is said to overlap $A(0)$ in one position and this is tabulated on line (iv) as OVERLAP=1. For lines (ii) and (iii), the overlaps are 0. Hence, $A(4)$ overlaps $A(0)$ in one position whereas $A(1)$ relative to $A(0)$ as well as $A(-1)$ relative to $A(0)$ have no overlaps.

The detection process in the continuous case can be thought of as a detector matching its pulse pattern against a continually shifting sequence of K chips. To use the terminology just introduced, in the case of frame-by-frame processing, only $A(-25), A(0), A(25)$, etc., would be compared with the code pattern of the detector. In the case of continuous processing, all intermediate intervals, i.e., A(−25),A(−24), ..., A(0),A(1), ..., A(24),A(25), are examined as well.

In an environment with multiple users, arbitrary combinations of codes may be combined in a single frame, corresponding to the simultaneous transmissions of "1" to multiple users. As described above, the superposition of multiple codes in a single frame generates gaps between pulses not necessarily found in individual codes. Continuous processing generates yet another source of new gaps, as now described.

Figure 5:
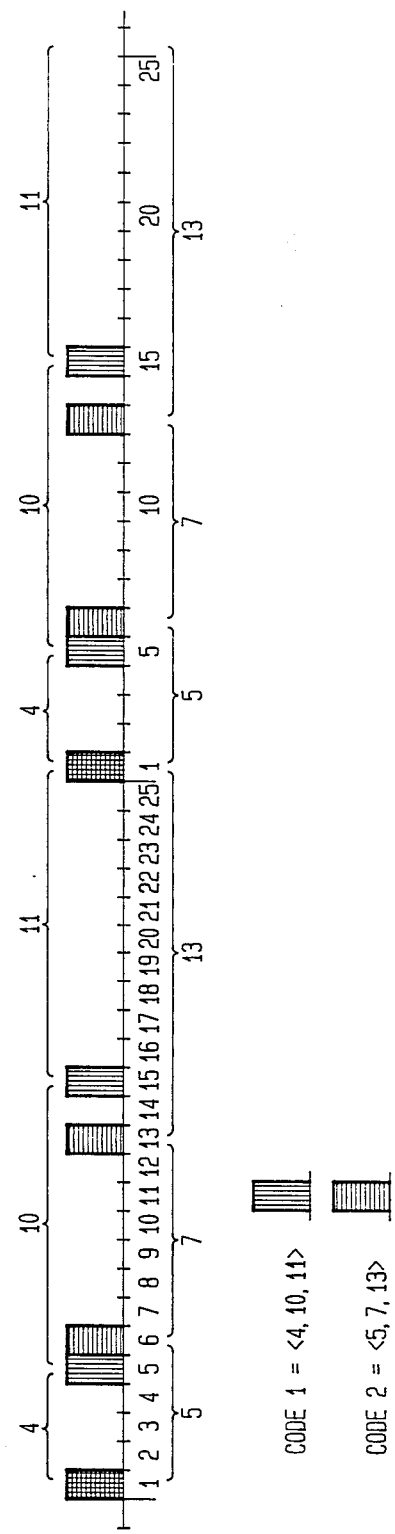
FIG. 5 illustrates the effect of superposition of code patterns on continuous processing.

In FIG. 5, a <4,10,11> code and a <5,7,13> code are shown superimposed on two consecutive 25 chip frames. Within each frame, new gaps appear that do not appear in either of the two individual codes. For example, a gap of 8 occurs between the marked 5th chip and the marked 13th chip and a gap of 2 exists between the marked 13th chip and the marked 15th chip. However, by matching a receiver's assigned pulse pattern with pulse patterns formed by concatenating pulse patterns in one frame with pulse patterns in another frame, continuous processing introduces many additional gaps. Suppose, for example, that a detector is processing the 25 chips starting with the 11th chip of the first frame and ending at the 10th chip of the second frame. The gap between the pulse in chip 13 in the first frame and chip 1 in the second, the gap between chip 13 in the first frame and chip 5 in the second, as well as many others, now appear. In general, many new gaps are formed by an initial pulse in one frame and a terminal pulse in the following frame, all within K chips. For the example in FIG. 5, the set of all possible gaps that can occur on the transmission line within K chips is:

{1,2,4,5,7,8,9,10,11,12,13,14,15,16,17,18,20,21,23,24}

Case II CDMA codes are defined to be codes with the property that even when arbitrary combinations of the codes are superimposed on successive frames, and the frames processed continuously, as described above, any detector will match with precisely 0, 1 or M pulses, and M pulses will be matched only when the receiver's corresponding code has been transmitted. This property can be described in terms of the delays detected during continuous processing. These delays must satisfy two properties.

1. Delays detected by different receivers must be distinct.
2. A delay which can be detected by some receivers will occur at most once in K transmitted chips.

An algorithm for generating codes saisfying these conditions is described in Section 3. Note that any codes satisfying these conditions automatically satisfy the conditions described earlier in Case I CDMA codes.

2. Illustrative Embodiments

Figure 6:
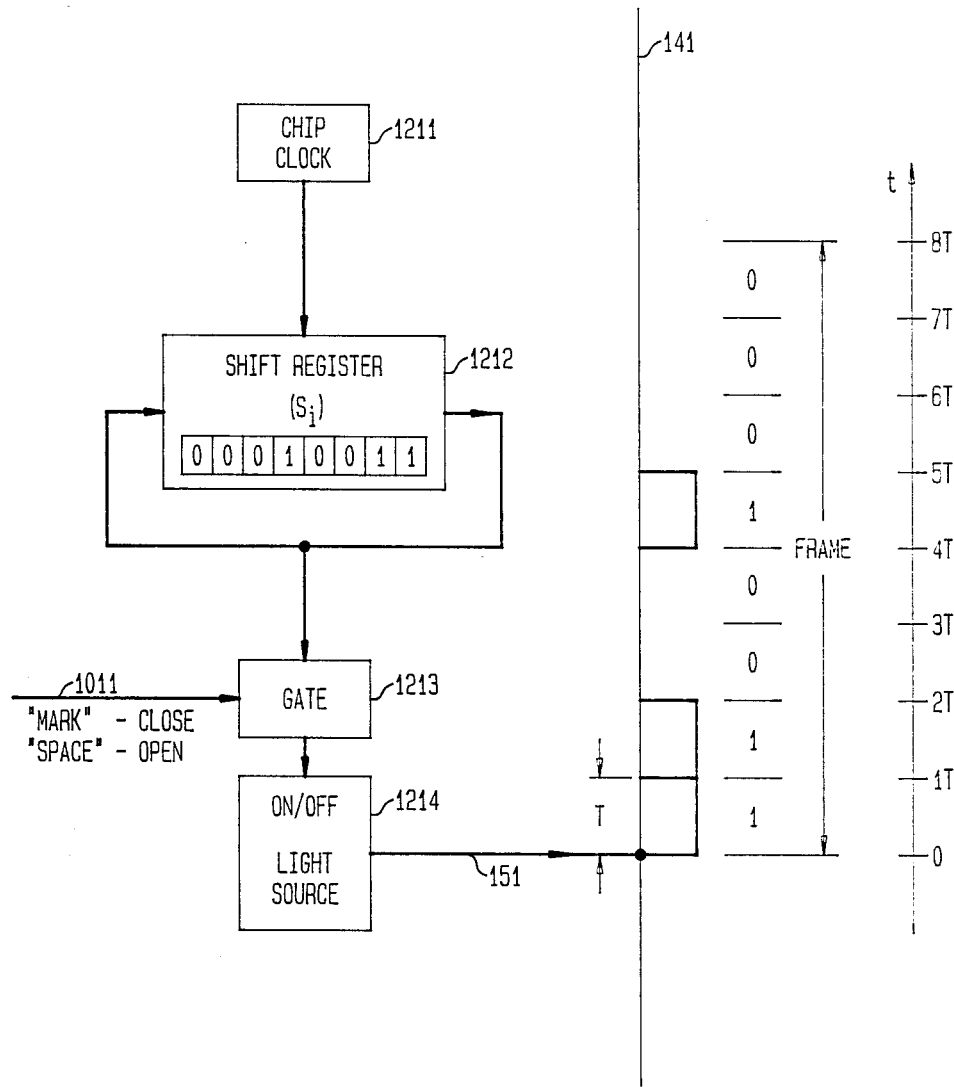
FIG. 6 is a block diagram depicting an encoder illustrative of the present invention.

In order to propagate the types of code patterns exemplified by FIGS. 3–5 over channel 141 of FIG. 1, one implementation for any encoder 121, 122 or 123, say encoder 121, depicted in block diagram form in FIG. 6 may be utilized. Chip clock 1211, which operates under control of clock 104 via lead 1041, outputs a pulse stream at the chip rate 1/T (T being the chip duration). Clock 1211 drives shift register 1212 and causes register 1212 to recirculate its stored bits. The bits shown as illustrative of the contents of register 1212 represent a typical eight-chip signal, designated generally as code G(0). The circulating bits serve as one input to AND gate 1213. The second input to gate 1213 is provided by lead 1011 emanating from source 101 of FIG. 1. Only a logic one or mark on lead 1011 causes gate 1213 to replicate the bits stored in register 1213 at the output of gate 1213, thereby providing the ON/OFF control of light source 1214. Lead 151 couples light source 1214 to channel 141. As depicted in FIG. 6, light pulses will be produced in the time periods between (0,T), (T,2T) and (4T,5T), corresponding to the G(0) code pattern stored in register 1212.

Figure 7:
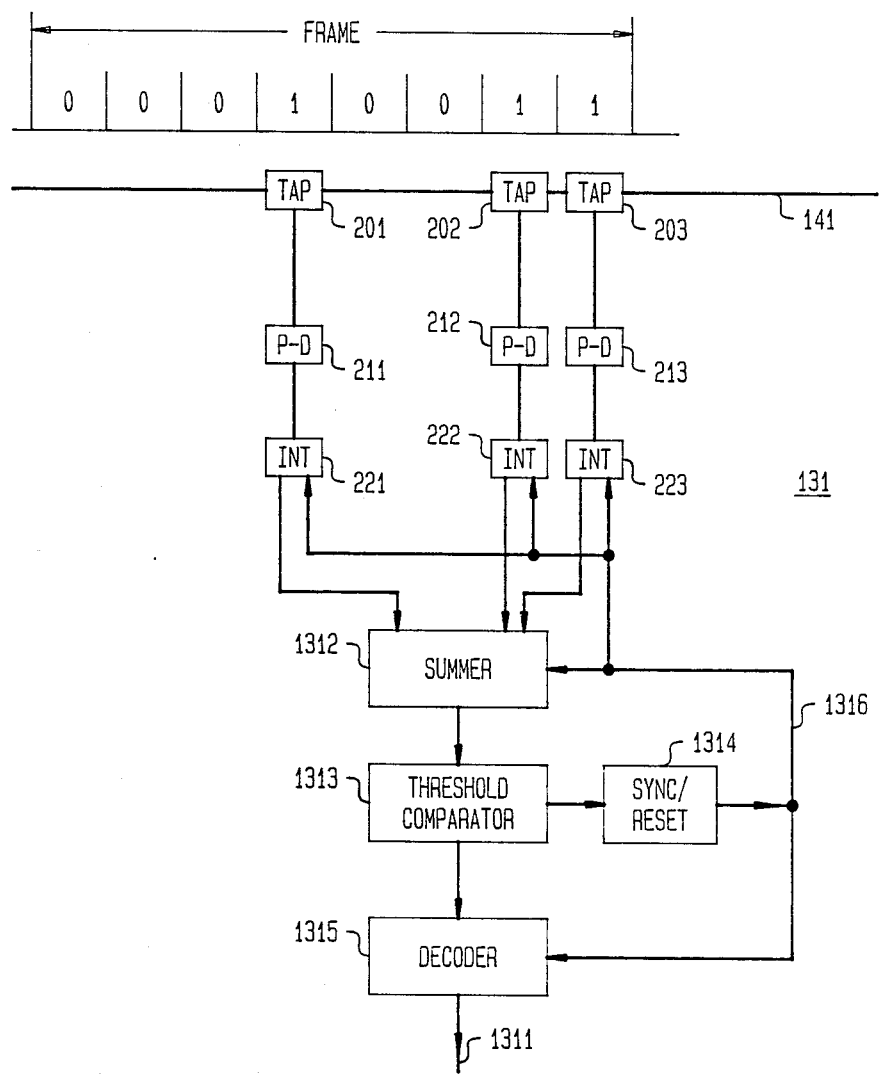
FIG. 7 is a block diagram depicting a decoder illustrative of the present invention.

To detect the types of code patterns propagating on channel 141 of FIG. 1, one implementation for any decoder 131,132 or 133, say decoder 131, as depicted in block diagram form in FIG. 7 may be utilized. The description that follows assumes that the decoder is already in system synchronism. Again, this may be accomplished via the well-known technique of providing a "training" session prior to the transmission of any actual data.

Taps 201–203 on channel 141 are positioned according to the time distribution of the preassigned code pattern. For instance, if decoder 121 is arranged to detect the G(0) pattern {1,1,0,0,1,0,0,0}, taps 202 and 203 are spaced apart 2T and 3T seconds in time, respectively, from tap 201, or in terms of optical length, the distance traveled by a pulse in 2T and 3T seconds. The positioning of the taps relative to an G(0) frame during one instant of the detection process is illustrated by the FRAME time diagram above channel 141 in FIG. 7.

Taps 201–203 feed corresponding optical photodetectors 211–213 and the individual outputs of these photo-detectors serve as inputs to integrators 221–223, respectively.

A channel signal $S_o$ on channel 141 having an embedded code pattern corresponding to the tap positions generates a detectable signal at the output of each photo-detector for the chip duration. Each corresponding integrator sums the output of the photo-detector for a prescribed time interval, typically the chip duration. The outputs of integrators 221–223 are combined via summer 1312. This accumulated signal is then provided to threshold comparator 1313 for comparison to a predetermined threshold. In terms of the previous discussion, if detector 131 is arranged to detect G(0) patterns, then the appearance of an G(0) frame in $S_o$ simultaneously provides a normalized signal of one unit at the end of the integration period from each integrator 221–223, respectively. Accordingly, summer 1312 registers a three unit output, and if the threshold is set to a normalized value of 2.5 units, the detection of this mark frame in comparator 1313 is indicated by enabling decoder 1315. Decoder 1315 performs a rate-decreasing operation to restore the original data rate. Each time decoder 1315 is enabled, lead 1311 registers a logic one at the original data rate.

If, however, the channel signal $S_o$ is composed of only the pattern {1,0,1,0,0,0,1,0} and summer 1312 is enabled for a single chip duration once per frame by circuit 1314, then only integrator 223 senses an overlap and summer 1312 never exceeds one unit. Thus, comparator 1313 provides a logic zero to lead 1311.

For instance, it is supposed that channel 141 is propagating a signal corresponding to the G(0) chip pattern and this signal is to be detected in the present frame; moreover, it is supposed that continuous processing occurs. Then, the precursor to G(0) is the sequence G(−7), G(−6), ..., G(−1), so that G(0) sweeps into view on a chip-by-chip basis at the input to detector 131. The post-cursor to G(0) is the sequence G(1), G(2), ..., G(7) as the propagating signal sweeps out of view of detector 131. Basically, detector 131 detects the overlap of G(k) relative to G(0) for k=−7,−6, ..., −1,1,2, ... 7. The effects of the signal occur over the present as well as the succeeding frame. For the present frame, the maximum peak detected is 3 units (G(0) relative to G(0)). For the next frame, the value detected is one unit, and this peak is due solely to the tail of the propagating signal. Detector 131 outputs a logic one for the present frame and logic zero for the next frame for a threshold of 2.5 units.

In the design of codes, it is necessary to select chip locations with sufficient separation so that tail and head ends of the composite channel signal do not overlap and thereby cause a peak detection even though a pattern corresponding to the detector signature is not present.

The special codes derived for the situation of enabling gate 1312 for only one chip duration per frame are called Case I codes. For this situation, processing is carried out discretely frame-by-frame, that is, no processing occurs between frame enablement periods.

It is possible to consider another situation in which processing is carried out continuously, that is, on a chip-by-chip basis within each frame. The codes for this situation, designated above as Case II codes, are derived from more restrictive circumstances than the Case I codes. Any set of codes derived for a Case II system are applicable to a Case I system. For Case II, the channel signal being processed by a particular decoder results from the tail end of a preceding frame and the head end of the succeeding frame overlapping portions of the frame under consideration. The overlapping of tail and head ends may be understood in terms of the discussion presented above.

It is apparent that integrators 221–223 and summer 1312 should be reset at the beginning of each chip duration for either Case I or Case II arrangements. This reset operation is controlled by sync/reset circuit 1314, via lead 1316, in the usual manner for electronic correlation-type detectors. Furthermore, circuit 1314 maintains encoder-decoder synchronism via an initial training session. Frame synchronization is supplied to decoder 1315, also via lead 1316 from circuit 1314.

3. General Code Properties

In the preceding sections, certain generalized properties were introduced during the discussion of the correlation evaluations. Codes to satisfy these properties are now derived.

Case I Codes

The following procedure yields Case I codes for a (k,w,s)-system where k, w and s are positive integers such that $1 \leq w \leq k$ and $$1 \leq s \leq \left\lfloor \frac{k-1}{w-1} \right\rfloor$$

with being the largest integer $\leq y$. In this notation, k is the total number of chips per frame, w is the number of logic one chips per frame, and s is the number of distinct codes in the (k,w,s)-system. In the patterns depicted by FIG. 5, k=25, w=3, s=2 and the patterns are Code 1 and Code 2. The procedure is:

(1) Create a w by s matrix by
  (i) randomly selecting, without replacement, $s \times (w-1)$ integers from $[1, k-1]$;
  (ii) filling up the first $w-1$ rows of the matrix with these values; and
  (iii) assigning the value k to each entry in the wth row.

(2) Obtain the jth code, denoted as $$D_j = <d_1, d_2, \ldots d_w>,$$

by:
  (i) taking the elements from the jth column of the matrix created in step (1) and putting them in ascending order in a vector, i.e., forming the vector $$B_j = >b_1, b_2, b_3, \ldots, b_w>$$

such that $b_1 < b_2 < b_3 < \ldots < b_w = k$; and
  (ii) multiplying $B_j$ by a matrix P of w rows and w columns which has a unit diagonal, −1's beneath each diagonal element, and 0's elsewhere, thereby obtaining $$P \times B_j = D_j$$

(3) Obtain the pulse pattern corresponding to $D_j$ over a frame duration by
  (i) marking the first chip, $c_1$, to signify a pulse; and
  (ii) continuing to mark the frame so that delay between the ith and (i+1)st marked chips is $d_i$.

As an example, this procedure is considered for a (8,3,2)-system to demonstrate how codes may be derived. It is first noted that the constraints $1 < w \leq k$ and $$1 \leq s \leq \left\lfloor \frac{k-1}{w-1} \right\rfloor)$$

are satisfied since $1 < 3 \leq 8$ and $1 \leq 2 \leq 7/2 = 3$.

Step (1) (i): four integers 1,2,4,6 are randomly selected since $s \times (w-1) = 4$;
Step (1) (ii)–(iii): form $$\begin{bmatrix} 1 & 2 \\ 4 & 6 \\ 8 & 8 \end{bmatrix},$$

a 3×2 matrix from the selected elements;
Step (2) (i): $B_1 = <1,4,8>$; $B_2 = <2,6,8>$;
Step (2) (ii) for $B_1$:

$$\begin{bmatrix} 1 & 0 & 0 \\ -1 & 1 & 0 \\ 0 & -1 & 1 \end{bmatrix} \begin{bmatrix} 1 \\ 4 \\ 8 \end{bmatrix} = \begin{bmatrix} 1 \\ 3 \\ 4 \end{bmatrix};$$

Step (2) (iii) for $B_2$:

$$\begin{bmatrix} 1 & 0 & 0 \\ -1 & 1 & 0 \\ 0 & -1 & 1 \end{bmatrix} \begin{bmatrix} 2 \\ 6 \\ 8 \end{bmatrix} = \begin{bmatrix} 2 \\ 4 \\ 2 \end{bmatrix};$$

Thus, $D_1 = <1,3,4>$; $D_2 = <2,4,2>$

Step (3) (i)–(ii) for $D_1$: the first chip $c_1$ is marked with a logic one pulse; the next chip to have a logic one pulse is chip $c_2$ since the offset or delay between chips $c_1$ and $c_2$ is $d_1$, which equals 1; the next chip with a logic one pulse is chip $c_5$ since the delay between $c_5$ and $c_2$ is $d_2 = 3$; finally, $d_3 = 4$ to guarantee that the sum of the $D_i$ is $k = 8$.

The derived code patterns for the Case I (8,3,2)-system are $D_1$ and $D_2$.

Case II Codes

The following procedure yields Case II codes for a (k,w,s)-system:

(1) Construct design matrix $P_1$ of $Q(Q-1)$ rows and $Q$ columns, where $Q = (w \times s) - s + 1$, and whose elements form the following design:

$$P_1 = \begin{bmatrix} 1000\ldots00 \\ 0100\ldots00 \\ 0010\ldots00 \\ \vdots \\ 0000\ldots01 \\ 1100\ldots00 \\ 0110\ldots00 \\ 0011\ldots00 \\ \vdots \\ 1000\ldots01 \\ 1110\ldots00 \\ 0111\ldots00 \\ \vdots \\ 1100\ldots01 \\ \vdots \\ 1111\ldots10 \\ 0111\ldots11 \\ \vdots \\ 1111\ldots01 \end{bmatrix} \begin{matrix} \} \text{one "1" per row} \\ \\ \\ \} \text{two "1"s per row with wrap around effect} \\ \\ \\ \} \text{three "1"s per row with wrap around effect} \\ \\ \\ \} \text{Q-1 "1"s per row with wrap around effect} \end{matrix}$$

(2) Construct design matrix $P_2$ of $$\frac{s(w-1)w}{2}$$

rows and $s(w-1)$ columns of the form:

$$P_2 = \begin{bmatrix} [T] & [O] & [O] & \ldots & [O] & [O] \\ [O] & [T] & [O] & \ldots & [O] & [O] \\ [O] & [O] & [T] & \ldots & [O] & [O] \\ & & \vdots & & & \\ [O] & [O] & [O] & \ldots & [T] & [O] \\ [O] & [O] & [O] & \ldots & [O] & [T] \end{bmatrix},$$

where [O] and [T] are each matrices of $$\frac{(w-1)(w)}{2}$$

rows and $(w-1)$ columns and such that [O] contains all zeros and [T] is a matrix whose elements form the following design:

$$T = \begin{bmatrix} 1000\ldots000 \\ 0100\ldots000 \\ 0010\ldots000 \\ \vdots \\ 0000\ldots001 \\ 1100\ldots000 \\ 0110\ldots000 \\ 0011\ldots000 \\ \vdots \\ 0000\ldots011 \\ 1110\ldots000 \\ 0111\ldots000 \\ \vdots \\ 1111\ldots110 \\ 0111\ldots111 \\ 1111\ldots111 \end{bmatrix} \begin{matrix} \} \text{one "1" per row} \\ \\ \\ \} \text{two "1"s per row with no wrap around effect} \\ \\ \\ \} \text{three "1"s per row with no wrap around effect} \\ \\ \} \text{w - 1 "1"s per row with no wrap around effect} \end{matrix}$$

(3) Determine a vector $$C = \langle c_1, c_2, \ldots, c_Q \rangle$$

of length $Q$ by (i) randomly selecting $Q-1$ integers from $[1, k-1]$ whose sum is less than $k$;

(ii) letting the first $Q-1$ elements of $C$ be these integers, set the last element to $$k - \sum_{i=1}^{Q-1} c_i.$$

(4) Convert the C-vector to chip locations having logic one representations in a frame of length $k$ chips.

(5) Assign pulse $c_1$ and $w-1$ other pulses to each of $s$ vectors.

(6) Assign $a_{i,j}$ to the ith element in the jth vector from the set of s vectors.

(7) Form the vector A as follows:

$$A = \langle a_{1,1}, \ldots, a_{w-1,1}, a_{1,2}, \ldots, a_{w-1,2}, \ldots, a_{l,s}, \ldots, a_{w-1,s} \rangle.$$

(8) Obtain vector $R_2$ by performing the matrix multiplication $$P_2 \times A = R_2$$

(9) Obtain vector $R_1$ by performing the matrix multiplication of $$P_1 \times C = R$$

(10) If the elements of $R_2$ are distinct and appear only once in $R_1$, then the s vectors $$\langle a_{1,1}, a_{2,1}, \ldots, a_{w-1,1}, a_{w,1}\rangle$$

$$\vdots$$

$$\langle a_{1,s}, a_{2,s}, \ldots, a_{w-1,s}, a_{w,s}\rangle$$

are Case II codes.

As an example, this procedure is considered for a (156,4,3)-system.

Steps (1) and (2): with 4 pulses per code and 3 codes desired, Q=10. Thus, $P_1$ has 90 rows and 10 columns; also, $P_2$ has 18 rows and 9 columns where $$T = \begin{bmatrix} 100 \\ 010 \\ 001 \\ 110 \\ 011 \\ 111 \end{bmatrix}$$

Step (3):

$$C = \langle 6,25,27,11,26,13,7,25,4,12\rangle$$

Steps (4) and (5): the three vectors formed from C are $$s_1 = \langle 6,89,49,12\rangle$$

$$s_2 = \langle 58,50,32,16\rangle$$

$$s_3 = \langle 31,38,46,41\rangle$$

by assigning the 2nd, 6th and 10th marked chips to $s_1$, the 4th, 7th and 9th marked chips to $s_2$, and the 3rd, 5th and 8th chips to $s_3$.

Steps (6) and (7):

$$A = \langle 6,89,49,58,50,32,31,38,46\rangle$$

Step (8):

$$R_2 = \langle 6,89,49,95,138,144,58,50,32,\\ 108,82,140,31,38,46,69,84,115\rangle.$$

Step (9):

$$\begin{aligned}R_1 = \langle\ &6, 25, 27, 11, 26, 13, 7, 25, 4, 12,\\ &31, 52, 38, 37, 39, 20, 32, 29, 16, 18,\\ &58, 63, 64, 50, 46, 45, 36, 41, 22, 43,\\ &69, 89, 77, 57, 71, 49, 48, 47, 47, 70,\\ &95,102, 84, 82, 75, 61, 54, 72, 74, 81,\\ &108,109,109, 86, 87, 67, 79, 99, 85,107,\\ &115,134,113, 98, 93, 92,106,110,111,120,\\ &140,138,125,104,118,119,117,136,124,127,\\ &144,150,131,129,145,130,143,149,131,152\ \rangle\end{aligned}$$

Step (10):

It can readily be verified that the elements in $R_2$ are distinct and appear only once in $R_1$. Accordingly, $s_1$, $s_2$ and $s_3$ provide appropriate codes for a Case II (156,4,3)-system.

What is claimed is:

1. In a system comprising synchronized encoders and decoders, a method for encoding an input data stream partitioned into frames in each of the encoders to produce a corresponding output data stream at a given rate detectable by at least one of the decoders, with each data stream comprising zero and non-zero states, said method of CHARACTERIZED BY THE STEPS OF associating a code vector from a bistate orthogonal code with the input stream, said code selected in correspondence to predetermined transmission characteristics of the system, and for each non-zero state in the input stream, generating a rate-increased data stream as determined by said code vector to represent said each non-zero state in the output stream, wherein each of the frames is subdivided into K chip intervals and said code comprises code vectors having M<K pulses, and wherein each code vector is expressed as $$\langle d_1, d_2, \ldots, d_M\rangle$$

with $d_i$ equaling the delay between the $i^{th}$ and $(i+1)^{st}$ pulses for $1 \leq i \leq M-1$ and $$d_M = K - \sum_{i=1}^{M-1} d_i,$$

said vectors selected so that, when superimposed and continuously processed over successive ones of the frames, exhibit the following two properties:

(i) delays detected by differenct ones of the decoders are distinct, and (ii) a delay detected by some of the decoders occurs at most once in the K intervals.

2. The method as recited in claim 1 wherein said chip intervals have an associated chip propagation rate and wherein the step of generating a rate-increased data stream comprises the steps of assigning each chip interval a zero or non-zero state in correspondence to the elements of said code vector, and sequentially emitting the asigned chip interval states at said chip rate to form said rate-increased data stream.

3. The method as recited in claim 2 wherein each data stream is composed of binary bits with logic one level corresponding to said non-zero state.

4. A method comprising the step of encoding a plurality of input mark-space binary streams partitioned into frames emitted by a plurality of transmitters to produce a corresponding plurality of output mark-space binary streams detectable by preselected receivers, said method further CHARACTERIZED BY THE STEPS OF synchronizing the receivers and the transmitters associating a bistate orthogonal code vector from a preselected code with each of the input streams, said code selected in correspondence to predetermined system requirements, and for each mark in each of the input streams, synchronously generating a rate-increased binary stream as determined by said associated code vector to represent said each mark in the corresponding one of the output streams, wherein each of the frames is subdivided into K chip intervals and said code comprises code vectors having $M \leq K$ pulses, and wherein each code vector is expressed as $$\langle d_1, d_2, \ldots, d_M\rangle$$

with $d_i$ equaling the delay between the $i^{th}$ and $(i+1)^{st}$ pulses for $1 \leq i \leq M-1$ and $$d_M = K - \sum_{i=1}^{M-1} d_i,$$

said vectors selected so that, when superimposed and continuously processed over successive ones of the frames, exhibit the following two properties:
(i) delays detected by differenct ones of the receivers are distrinct, and
(ii) a delay detected by some of the receivers occurs at most once in the K intervals.

5. In a synchronized system comprising transmitters and receivers, a method for encoding a plurality of input binary streams partitioned into frames in each transmitter to produce a corresponding plurality of output data streams detectable by predetermined receivers, said method CHARACTERIZED BY THE STEPS OF storing a set of bistate orthogonal code vectors from a preselected code in an addressable memory in each of the transmitters and assigning each said code vectors to one of said input streams, said set selected in correspondence to predetermined system requirements, and for each binary one in each of the input streams, accessing said memory to identify said assigned code vector associated with said each of the input streams and syschronously generating a rate-increased binary stream in correspondence to said identified code vector as the substitute for said binary one in the corresponding stream from the output streams, wherein each of the frames is subdivided into K chip intervals and said code comprises code vectors having $M \leq K$ pulses, and wherein each code vector is expressed as $<d_1, d_2, \ldots, d_M>$ with $d_i$ equaling the delay between the $i^{th}$ and $(i+1)^{st}$ pulses for $1 > i \leq M-1$ and $$d_M = K - \sum_{i=1}^{M-1} d_i,$$

said vectors selected so that, when superimposed and continuously processed over successive ones of the frames, exhibit the following two properties:
(i) delays detected by different ones of the decoders are distinct, and
(ii) a delay detected by some of the decoders occurs at most once in the K intervals.

6. A method for communicating information partitioned into frames at a given rate between encoder and decoder pairs asa a binary stream transmitted over a path interconnecting the encoders and decoders, said method CHARACTERIZED BY THE STEPS OF
synchronizing the encoders and decoders
associating a code vector from a bistate orthogonal code with each of the encoders, said codes selected in correspondence to predetermined communication requirements including the number of users coupled to the path and the bandwidth of the path, wherein each of the frames is subdivided into K chip intervals and said code comprises code vectors having $M < K$ pulses, and wherein each code vector is expressed as $<d_1, d_2, \ldots, d_M>$ with $d_i$ equaling the delay, between the $i^{th}$ and $(i+1)^{st}$ pulses for $1 > i > M-1$ and $$d_M = K - \sum_{i=1}^{M-1} d_i,$$

said vectors selected so that, when superimposed and continuously processed over successive ones of the frames, exhibit the following two properties:
(i) delays detected by differenct ones of the decoders are distint, and
(ii) a delay detected by some of the decoders occurs at most once in the K intervals,
for each binary one received by each of the encoders, propagating over the path a rate-increased binary stream as determined by said code vector, and
arranging each of the decoders in energy transfer relation to the path at detection points determined by the code vector to produce a detected signal whenever said rate-increased stream is propagating over the path.

7. In combination, an optical communication path, a plurality of encoders and decoders, each of the encoders comprising
a source of light pulses,
means responsive to an input binary stream partitioned into frames for enabling said source to generate light pulses in correspondence to components of a code vector from a bistate orthogonal code, and
means, coupled to said means for enabling, for propagating said pulses as a rate-increased output stream onto said path, and
means for synchronizing said encoders and decoders to detect said output stream with a corresponding one of the decoders,
wherein each of the frames is subdivided into K chip intervals and said code comprises code vectors having $M < K$ pulses, and wherein each code vector is expresses as $<d_1, d_2, \ldots, d_M>$ with $d_i$ equaling the delay between the $i^{th}$ and $(i+1)^{st}$ pulses for $1 \leq i \leq M-1$ and $$d_M = K - \sum_{i=1}^{M-1} d_i,$$

said vectors selected so that, when superimposed and continuously processed over successive ones of the frames, exhibit the following two properties:
(i) delays detected by different ones of the decoders are distinct, and
(ii) a delay detected by some of the decoders occurs at most once in the K intervals.

8. Circuitry comprising decoders for decoding a rate-increased data stream partitioned into frames propagating over a communication path, the stream formed in each of a plurality of encoders by associating a code vector from a bistate orthogonal code with each binary one in an input data stream and by transmitting a series of pulses during intervals determined by the code for each binary one in the input stream, said circuitry *CHARACTERIZED BY*

- means for synchronizing the decoders and the encoders,
- means associated with each of the decoders, in energy transfer relation to the path at the detection points corresponding to the distribution of components of the code vector, for sensing on the path an array of sensed signals, and
- means, coupled to said means for sensing, for processing said sensed signals and for providing a decoded signal whenever a series of pulses corrsponding to the code vector propagates along the path,
- wherein each of the frames is subdivided into K chip intervals and said code comprises code vectors having M<K puses, and wherein each code vector is expresses as $<d_1, d_2, \ldots d_M>$ with $d_i$ equaling the delay between the $i^{th}$ and $(i+1)^{st}$ pulses for $1 \leq i \leq M-1$ and $$d_M = K - \sum_{i=1}^{M-1} d_i,$$

said vector selected so that, when superimposed and continuously processed over successive ones of the frames, exhibit the following two properties:
  (i) delays detected by differenct ones of the decoders are distinct, and
  (ii) a delay detected by some of the decoders occurs at most once in the K intervals.

9. A system for transmitting information from a plurality of synchronized electrical sources to a plurality of synchronized receivers over a common optical channel, said system comprising an electrooptical encoder connected to each of said sources, each of said encoders comprising means for generating a unique pattern of rate-increased optical pulses partitioned into frames for each corresponding electrical pulse from its connected electrical source, said unique pattern selected in correspondence to one code vector of a bistte orthogonal code,

- wherein each of the frames is subdivided into K chip intervals and said code comprises code vectors having M<K pulses, and wherein each code vector is expressed as $<d_1, d_2, \ldots d_M>$ with $d_i$ equaling the delay between the $i^{th}$ and $(i+1)^{st}$ pulses for $1 \leq i \leq M-1$ and $$d_M = K - \sum_{i=1}^{M-1} d_i,$$

said vectors selected so that, when superimposed and continuously processed over successive ones of the frames, exhibit the following two properties:
  (i) delays detected by different ones of the receivers are distinct, and
  (ii) a delay detected by some of the receivers occurs at most once in the K intervals.

10. In a binary communication system having a plurality of autonomous encoders and decoders connected to a common channel, a method comprising the steps of

- associating a unique decoder and a code vector from a bistate orthogonal code pattern with each encoder and configuring each decoder according to the code vector of its associated encoder,
- synchronizing the encoders and decoders, and
- for each binary one input to each encoder, propagating over the channel a rate-increased data stream partitioned into frames as determined by the code vector associated with the encoder,
- wherein each of the frames is subdivided into K chip intervals and said code comprises vectors having M<K pulses, and wherein each code vector is expressed as $<d_1, d_2, \ldots, d_M>$ with $d_i$ equaling the delay between the $i^{th}$ and $(i+1)^{st}$ pulses for $1 \leq i \leq M-1$ and $$d_M = K - \sum_{i=1}^{M-1} d_i,$$

said vectors selected so that, when superimposed and continuously processed over successive ones of the frames, exhibit the following two properties:
  (i) delays detected by different ones of the decoders are distinct, and
  (ii) a delay detected by some of the decoders occurs at most once in the K intervals.

11. A method for decoding in each of a plurality of decoders a rate-increased data stream *CHARACTERIZED BY THE STEPS OF*

- forming the stream in each of a plurality of encoders by associating a code vector from a bistate orthogonal code with each binary one in an input data stream and by transmitting over a path interconnecting the encoders and decoders a series of pulses during intervals determined by the code vector for each binary one in the input stream,
- wherein each of the frames is subdivided into K chip intervals and said code comprises code vectors having M<K pulses, and wherein each code vector is expressed as $<d_1, d_2, \ldots d_M>$ with $d_i$ equaling the delay between the $i^{th}$ and $(i+1)$ st pulses for $1 \leq i \leq M-1$ and $$d_M = K - \sum_{i=1}^{M-1} d_i,$$

said vectors selected so that, when superimposed and continuously processed over successive ones of the frames, exhibit the following two properties:
  (i) delays detected by different ones of the decoders are distinct, and
  (ii) a delay detected by some of the decoders occurs at most once in the K intervals,
- synchronizing the encoders and decoders for rate-increased transmission,
- for each of the decoders, arranging a sensor array in energy transfer relation to the path at detection points determined by its associated code vector from the bistate orthogonal code, and processing the output of said sensor array to produce a decoder signal whenever a series of pulses corresponding to said associated code vector is propagating along the path.

12. The method as recited in claim 11 wherein the step of processing includes the step of enabling said sensor array for preselected durations in correspondence to said frames.

13. The method as recited in claim 11 wherein the step of arranging a sensor array in energy transfer relation comprises the step of coupling energy detectors to the path at said detection points.

14. The method as recited in claim 11 wherein said path comprises a fiber optic cable, wherein the step of arranging a sensor array i energy transfer relation to the path includes the steps of tapping electro-optical energy from said cable at said detection points, and feeding said electro-optical energy to a photodetectpr arrangement to provide a received signal as said output of said sensor array, and wherein said step of processing includes the steps of threshold detecting said received signal to produce a threshold signal, and generating said decoded signal whenever said threshold signal is above a predetermined threshold.

* * * * *

UNITED STATES PATENT AND TRADEMARK OFFICE
CERTIFICATE OF CORRECTION

PATENT NO. : 4,779,265

DATED : October 18, 1988

INVENTOR(S) : O'Connor-Salehi-Kerner

It is certified that error appears in the above-identified patent and that said Letters Patent is hereby corrected as shown below:

Column 4, line 1, change "channel. level" to --channel level--.

Column 5, line 64, change "tour" to --four--.

Column 9, line 54, change "$1 \leq w \leq k$" to --$1 < w \leq k$--;

Column 9, line 60, change "with being" to --with $\lfloor y \rfloor$ being--.

Column 10, line 15, change "$B_j = >$" to --$B_j = <$--;

Column 10, line 39, change "$7/2 = 3$" to --$\lfloor 7/2 \rfloor = 3$--.

Column 12, line 64, change "$P_1 \times C = R$" to --$P_1 \times C = R_1$--.

Column 14, line 2, change "method of CHARACTERIZED" to --method CHARACTERIZED--.

Column 15, line 11, change "differenct" to --different--;

Column 15, line 12, change "distrinct" to --distinct--;

Column 15, line 31, change "syschronously" to --synchronously--;

Column 15, line 43, change "$1 > i \leq M-1$" to --$1 \leq i \leq M-1$--;

Column 15, line 58, change "asa" to --as--.

Column 16, line 7, change "$1 > i > M-1$" to --$1 \leq i \leq M-1$--;

Column 16, line 16, change "distint" to --distinct--;

Column 16, line 47, change "expresses" to --expressed--.

UNITED STATES PATENT AND TRADEMARK OFFICE
CERTIFICATE OF CORRECTION

PATENT NO. : 4,779,265

DATED : October 18, 1988

INVENTOR(S) : O'Connor-Salehi-Kerner

It is certified that error appears in the above-identified patent and that said Letters Patent is hereby corrected as shown below:

Column 17, line 18, change "M<K puses" to --M<K pulses--;

Column 17, line 19, change "expresses" to --expressed--;

Column 17, line 33, change "differenct" to --different--;

Column 17, line 46, change "bistte" to --bistate--.

Column 18, line 14, change "code comprises vectors" to --code comprises code vectors--;

Column 18, lines 51-52, change "(i+1) st" to --(i+1)$^{st}$.

Column 19, line 4, change "decoder" to --decoded--.

Column 20, line 3, change "array i energy" to --array in energy--;

Column 20, line 7, change "photodetectpr" to --photodetector--.

Signed and Sealed this

Twenty-sixth Day of January, 1993

Attest:

STEPHEN G. KUNIN

*Attesting Officer*  *Acting Commissioner of Patents and Trademarks*